Aug. 4, 1970 K. A. SIMONS ET AL 3,522,453

VARIABLE ATTENUATORS

Filed July 15, 1966 2 Sheets-Sheet 1

INVENTORS
KENETH A. SIMONS
GEORGE OTTO DUTY

BY Hopgood & Calimafde
ATTORNEYS.

INVENTORS
KENETH A. SIMONS
GEORGE OTTO DUTY
BY
Hopgood & Calimafde
ATTORNEYS.

United States Patent Office 3,522,453

Patented Aug. 4, 1970

3,522,453

VARIABLE ATTENUATORS

Keneth A. Simons, Bryn Athyn, and George Otto Duty, Glenside, Pa., assignors to Jerrold Electronics Corporation, Philadelphia, Pa., a corporation of Delaware Filed July 15, 1966, Ser. No. 565,532
Int. Cl. H03k 3/02
U.S. Cl. 307—264 4 Claims

ABSTRACT OF THE DISCLOSURE

A high frequency attenuator free of harmonic distortion is described wherein a unijunction transistor is employed. The unijunction transistor has one emitter base junction connected generally in the path of high frequency signals operating in the frequency range from 100 kHz. up into the microwave frequency spectrum with the other base left unconnected in the floating condition. Several biasing circuits are described for forwardly biasing the emitter base junction to obtain variable signal attenuation by the variation of the bias current.

This invention relates to semi-conductor devices, and more especially it relates to such devices which have particular and peculiar utility as attenuator, gain-control and similar components, in high frequency transmission systems.

It has been proposed heretofore to use the electronic characteristics of conventional diodes as attenuator control elements, but such diodes because of their relative short lifetime among other factors introduce certain problems. Furthermore, they tend to change their resistance during an excitation cycle, especially at high frequencies. Such limitations of conventional diodes introduce appreciable and, oftentimes, objectionable harmonic distortion, particularly at higher levels of signal voltage. In an effort to overcome such limitations it has been proposed to use so-called PIN diodes as variable resistors. However, the critical nature of such PIN diodes, both as regards the control of their normal and dynamic electric parameters, render them very expensive when compared with conventional diodes. Furthermore, by reason of their usual mechanical design requirements, it is difficult with PIN diodes to obtain the desired temperature and mechanical stability without resorting to expensive parameter controls.

We have discovered that the objections to the use of conventional diodes and PIN diodes as settable or controllable attenuators can be overcome by employing the designs and techniques of so-called unijunction transistors to provide relatively inexpensive and satisfactory attenuation at high frequency operation. As part of such discovery, we have found that a conventional unijunction transistor can be used as a settable attenuator having the desired characteristics at high frequency operation, by externally biasing only one of the usual ohmic base contacts, leaving the other base contact floating or disconnected dynamically from the associated high frequency circuit.

Accordingly, one of the principal objects of this invention is to extend the field of usefulness of unijunction transistors so as to enable them to be used as precise and highly stable resistors in high frequency circuits.

In high frequency systems such as those required to operate between 100 kilohertz and 500 megahertz, it is often required to control or set the amplitude of the high frequency signals by means of an electronically settable or controllable resistance, as distinguished from the use of a mechanically adjustable device such, for example, as a conventional shiftable potentiometer contact. In certain fields of use, for example, in the field of television distribution or transmission, in which the system must accommodate an optimum number of discrete television frequency channels with minimum interchannel interference or distortion, the matter of obtaining uniform signal level at one or more points in the system is of great importance. While conventional diodes have heretofore been used as attenuation control devices, as pointed out hereinabove, serious signal distortion effects are encountered, not the least of which is that their inherent resistance at high frequency operation varies with change in the voltage or current level of the high frequency signal.

As an example of the limitations of the use of conventional diodes reference may be had to their use in four-terminal attenuator networks wherein the output impedance and the input impedance should be independent of the voltage or current signal condition, otherwise serious wave shape distortion or harmonic distortion may occur. A similar condition is encountered in the use of conventional diodes as gain-control elements.

Accordingly, another object of this invention is to provide a wave transmission system employing one or more semi-conductor devices whose high frequency resistance is independent of the high frequency voltage or current of the signals transmitted through the system.

Another object is to provide such a semi-conductor device connected according to the invention so that it can be readily set or adjusted to any desired resistance condition which remains constant over a wide range of voltage or current level in the applied high frequency signals.

A feature of the invention relates to a wave transmission system wherein a unijunction transistor can be used to obtain the desired attenuation or gain-control, without introducing signal distortions or wave shape distortions, even though the input signals may have a wide range of current or voltage level.

A further feature relates to the novel organization, arrangement and relative interconnection of parts which cooperate to provide an improved attenuation or gain-control in high frequency transmission or distribution systems.

Other features and advantages not specifically enumerated will be apparent after consideration of the following detailed description and the appended claims.

In the drawing which illustrates certain embodiments,

Figure 1:
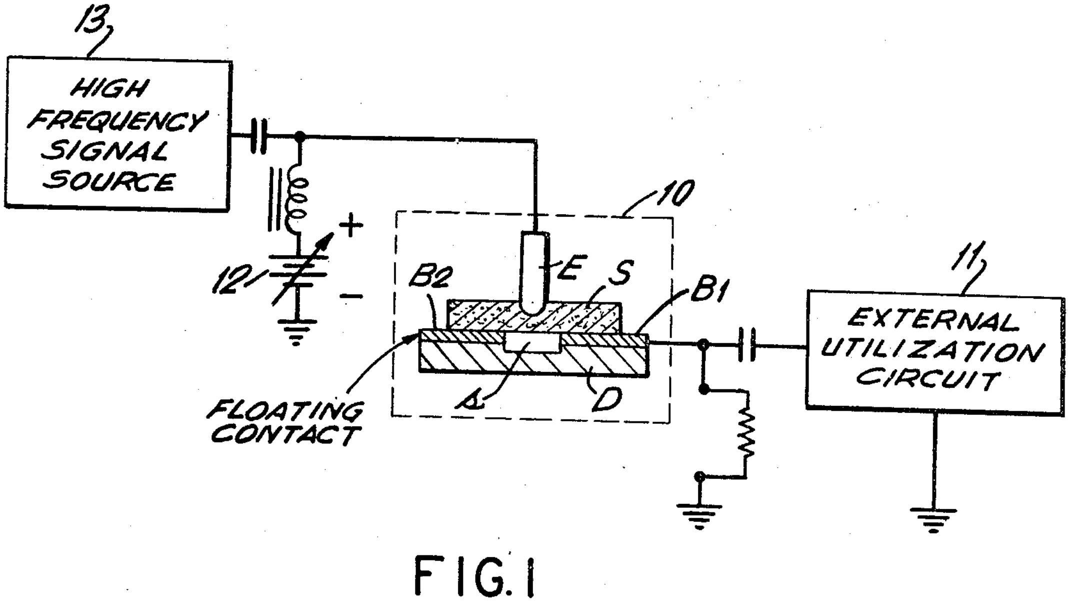
FIG. 1 is a schematic representation of a simplified high frequency transmission arrangement embodying a unijunction transistor according to the invention.

Referring to FIG. 1, the numeral 10 represents schematically the structure of any well-known unijunction transistor comprising the slitted ceramic disc D whose slits *s* is bridged symmetrically by the N-type silicon bar S. The surface of disc D carries a gold or similar coating on both sides of slit *s* and these provide respective true ohmic contacts to the opposite ends of bar S and referred to herein as base B1 and base B2, respectively. A single emitter contact E is provided in emitter contact relation with the upper face of bar S, any suitable wire, such as aluminum, being used for that purpose to provide the appropriate P–N emitter junction with bar S. In accordance with known principles, the said junction is located asymmetrically with respect to slit *s*, so that the semiconductor path between the said junction and base B1 is greater than the path between the said junction and base B2. When the emitter E is not energized by a signal to be transmitted, the transistor can be designed with any desired resistance between the two bases, for example, between 5K ohms and 10K ohms.

Heretofore it has been considered necessary in using such a device, to apply a D.C. bias voltage across the two bases, that is, across the full length of bar S, so that the said bar acts in the nature of a simple voltage divider, and also to connect the two bases across the external high frequency circuit to be controlled. We have found, on the contrary, that certain advantages are obtained if the D.C. bias is applied to only one of the bases, for example, to base B1, while leaving the other base B2 floating or unbiased. Thus, as illustrated in FIG. 1, the base B1 is connected to ground through a suitable external utilization circuit 11 and is forwardly biased by an adjustable D.C. potential schematically represented by battery 12. A suitable source of high frequency signals 13 is connected to the emitter E.

Figure 2:
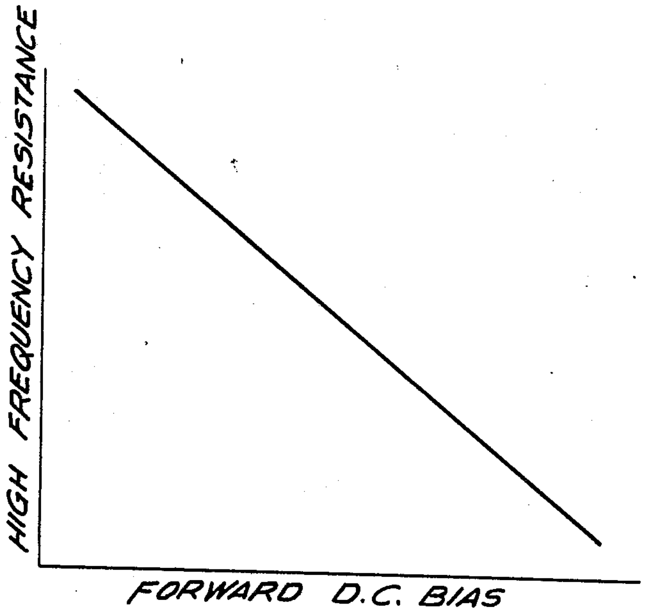
FIG. 2 is a graph showing the inverse relation between the high frequency resistance and the direct current flow of a unijunction transistor connected with one ohmic base floating according to the invention.

We have found from actual tests with such an arrangement that the wave shape of the signals from the input 13 can be attenuated to any considerable extent merely by adjusting or setting the D.C. bias of battery 12 on emitter E, and that the signals in the external utilization circuit 11 are substantially free from any wave shape or harmonic distortion. Furthermore, we have found that the freedom from such distortion is maintained over a very wide range in the voltage or current of the signals from source 13. In other words, the signals can be transmitted through the system without distortion while choosing any desired attenuation setting for the system. As shown in the graph of FIG. 2, the high frequency resistance of the system is inversely related to the direct current and is independent of the high frequency voltage.

The described manner of connecting the unijunction transistor with one base floating (that is, with the floating base having no substantial functional significance) causes it to operate in a manner which is different from its operation when conventionally connected with both bases biased. While we do not wish to be limited to any theory of operation, it is quite clear that in the conventional use of unijunction transistors, the semi-conductor bar S acts practically as a voltage divider with the voltage division between the two parts of the bar being utilized for control purposes. Therefore, the current flowing to base 1 will be a function not only of the current or voltage level of the input signal but also of the dynamic resistance ratios between the two sections of the bar S. Thus, the use of the conventionally connected unijunction transistor tends to produce harmonic distortion in the output wave shape, while with one of the bases floating according to the invention, such distortion is substantially avoided.

Figures 3, 4:
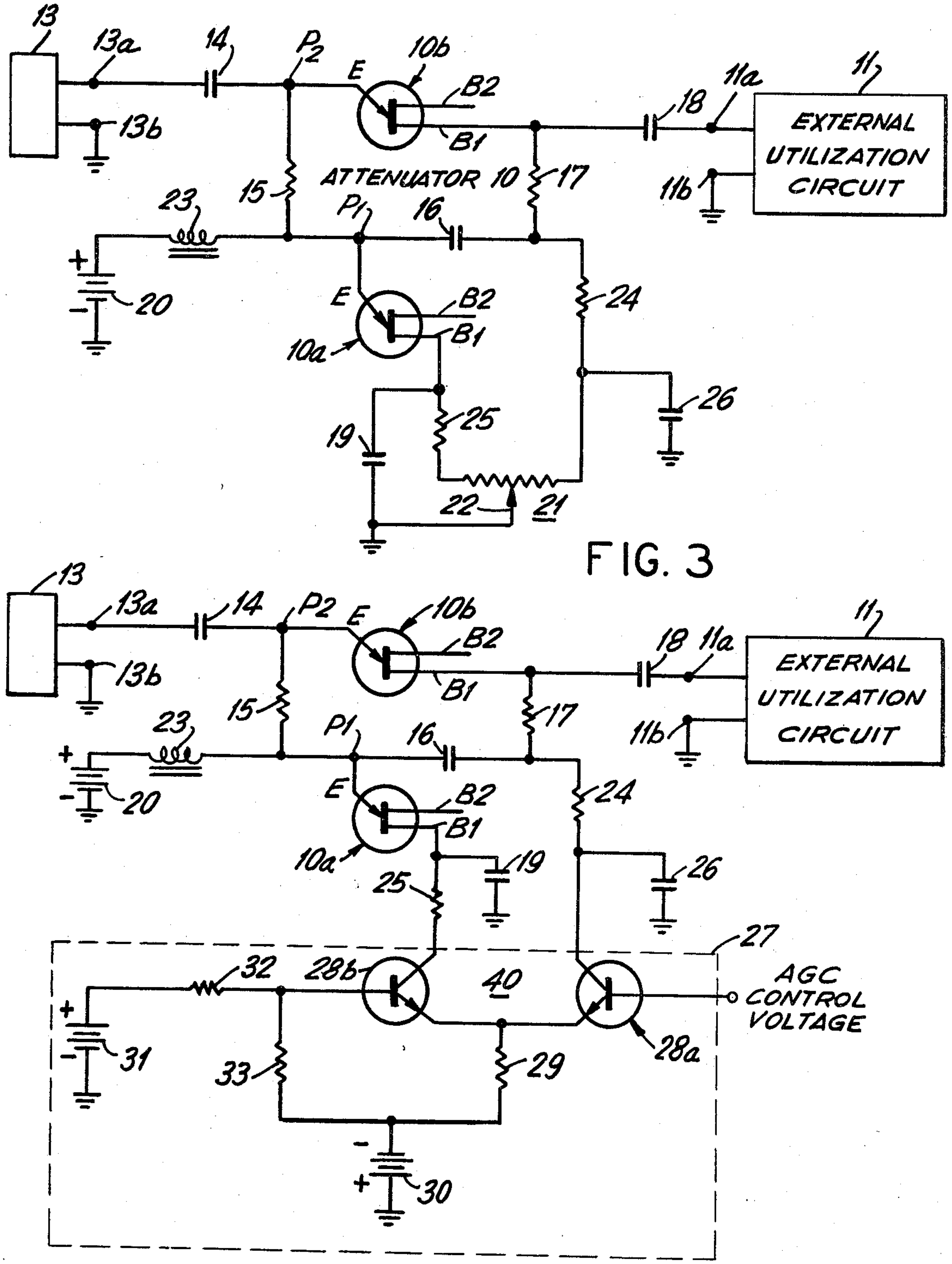
FIG. 3 shows an improved bridged-T settable attenuator network employing a unijunction transistor according to the invention.
FIG. 4 shows an improved automatic gain-control system employing a unijunction transistor according to the invention.

The above-described advantages of the unijunction transistor with one base floating enables the design of more satisfactory devices such as settable or controllable attenuators or gain-control circuits to be achieved for high frequency operations. A typical attenuator network is shown in FIG. 3 wherein certain of the designation numerals and symbols are used for parts corresponding to those of FIG. 1. Thus, the high frequency source 13 which may be, for example, a source of television channel signals, is connected to the input terminals 13*a*, 13*b*. Preferably, the terminal 13*b* may be a common terminal of the system and may be at ground potential. The utilization circuit 11 is connected to the output terminals 11*a*, 11*b* of the attenuator 10. In this particular embodiment the attenuator 10 includes two separate unijunction transistors 10*a*, 10*b*, each having its base B2 floating or unconnected to any external biasing source.

The high frequency signal from terminals 13*a*, 13*b* of FIG. 3 is applied through a D.C. blocking capacitor 14, a first resistor arm 15, D.C. blocking capacitor 16, a second resistor arm 17, D.C. blocking capacitor 18, and then to terminal 11*a* of the utilization circuit 11. Resistor arms 15 and 17 are of equal resistance and constitute the two series resistor arms of the bridged-T network. The high frequency signal reaching junction point P1 is conducted by way of the emitter E and base B1 of the unijunction transistor 10*a* and thence through the high frequency bypass capacitor 19 to ground. Similarly, the point P2 of the bridged-T network is connected to the emitter E of unijunction transistor 10*b*, base B1, thence through capacitor 18 to terminal 11*a* of the utilization circuit 11. In other words, the basic four branches of the bridged-T network are constituted, respectively, of the resistors 15, 17 and the two unijunction transistors 10*a*, 10*b*.

Unijunction transistors are well-known, per se, in the art and their operation with both bases D.C. biased is also well-known. In accordance with the present invention, and as already noted, the bases B2 of both unijunction transistors are floating. However, the bases B1 of both transistors are D.C. biased forwardly by means of the battery 20 and the potentiometer 21, whose adjustable arm 22 is connected to the common ground terminal. This forward bias may be traced from the positive pole of battery 20, high frequency choke 23 to two paths which diverge. One path includes series arm resistor 15, emitter E of transistor 10*b*, base B1 of that transistor, series resistor arm 17, resistor 24, potentiometer contact 22 to ground. The other path is through emitter E of transistor 10*a*, base B1 of that transistor, current limiting resistor 25, to ground through the potentiometer 22. The choke 23 provides a high impedance to the high frequency signals so that they are prevented from flowing to ground through battery 20. Likewise, a high frequency bypass capacitor 26 is provided around the potentiometer 21 to prevent the signals from flowing through the D.C. potentiometer circuit.

The resistance provided by the two transistors 10*a*, 10*b*, as seen the input signal, is a pure resistance with substantially negligible values of capacitance and inductance. Thus, the attenuator network is substantially linear in attenuation for the input signal frequency, and the amount of attenuation can be varied without producing harmonic distortion or other wave shape distortion.

The high frequency resistance between each base B1 and its emitter is inversely proportional to the forward D.C. flow from emitter to base. By means of potentiometer 21, the respective forward emitter-to-base currents of the devices 10*a* and 10*b* can be adjusted so that, for example, each can be varied from a maximum of 7000 ohms to a minimum of 10 ohms. By means of the setting of contact 22 of potentiometer 21, and the connection to battery 20 to base B1, the D.C. forward current can be adjusted so that, as the emitter-to-base high frequency resistance of unijunction transistor 10*a* is increased by the potentiometer setting, the emitter-to-base high frequency resistance of unijunction transistor 10*b* is equally and simultaneously decreased. Thus, the attenuation of the system is a maximum when transistor 10*a* provides its minimum emitter-to-base resistance, while transistor 10*b* provides a corresponding maximum resistance, and vice versa, depending upon the direction in which the contact 22 is moved. In other words, the attenuation of the system will be maximum when contact 22 is at its extreme left hand setting. As that contact is moved to the right, the attenuation decreases. A that time, the forward emitter-to-base current transistor 10*a* will be at its minimum, while the forward emitter-to-base current of transistor 10*b* will be maximum. Accordingly, the high frequency resistance of transistor 10*a* is at its maximum, while the high frequency resistance of transistor 10*b* is at its minimum, and the network attenuation will be minimum. Stated in other words, the resistance of the body branch of the network is inverse with relation to the bridge branch.

FIG. 4 shows the invention embodied in an automatic gain-control system. The parts of FIG. 4 which function similarly to parts of FIG. 3, bear the same designations. However, the function of potentiometer 21 is replaced by a differential amplifier 27 which includes a pair of NPN transistors 28*a*, 28*b*. The forward D.C. flow through unijunction transistor 10*b* is traceable through resistor 17, resistor 24, collector, base and emitter of transistor 28*a*, common emitter resistor 29, to the negative terminal of battery 30 whose positive pole is grounded. Similarly, the forward D.C. flow through unijunction transistor 10*a* is traceable through resistor 25, collector, base and emitter of transistor 28*b*, resistor 29 to the same negative terminal of battery 30. A reference potential is applied to the base of transistor 28*b*, traceable from the positive terminal of a reference battery 31, through a voltage divider constituted of resistors 32, 33 and the negative terminal of battery 30. The junction of resistors 32, 33 is connected to the base of transistor 28*b*. The automatic gain-control (AGC) voltage is applied to the base of transistor 28*a*, so that when the AGC signal increases in a negative-going direction, the conductivity of transistor 28*b* decreases, and vice versa, when the AGC signal goes positive. In this manner the forward D.C. flow through unijunction transistor 10*a* decreases, and vice versa. Consequently, the respective high frequency resistances of unijunction transistor 10*a* and unijunction transistor 10*b* are controllable in inverse relation to each other to vary the attenuation of the network while maintaining the input and output impedances of the network constant.

While certain specific embodiments of the invention have been given, it will be understood that these embodiments are not restrictive but are illustrative only and that other similar embodiments may be made within the scope of the invention, so long as such other embodiments are based on the novel features of construction and interconnection as described hereinabove. Thus, while the B2 bases of the unijunction transistors are floating while the B1 bases are adjustably biased, it will be obvious that the opposite may be used, that is, bases B2 may be biased and bases B1 floating.

What is claimed is:

1. The method of using a unijunction transistor having an emitter and a pair of bases for controlling the attenuation in a high frequency network operating over a frequency range from 100 kHz. to 500 mHz. so as to provide a constant input impedance and a constant output impedance while maintaining the network substantially free from harmonic distortion of the high frequency signals passing therethrough, which comprises applying a signal in the frequency range of from 100 kHz. to 500 mHz. to the emitter, and applying a controllable forward D.C. bias to the emitter and one of the ohmic base contacts of the unijunction transistor while maintaining the other ohmic base contact floating.

2. An attenuator for attenuating high frequency signals between input and output terminals wherein the signals are in the frequency range of from 100 kHz. to 500 mHz., comprising, a resistance path including a unijunction transistor having p-n junctions between an emitter and a pair of bases with the junction between the emitter and one ohmic base contact placed generally in the path of high frequency signals operating over the stated frequency range, said other ohmic base unconnected in floating condition, a biasing circuit electrically isolated from the high frequency signals and coupled across the p-n junction between the emitter and said one base to provide a forward bias current of a magnitude selected commensurate with the desired attenuation of the high frequency signals produced by said one base to emitter resistance, a second unijunction transistor having p-n junctions between an emitter and a pair of bases with the p-n junction between the emitter and one of the bases being forwardly biased by the biasing circuit, said other second unijunction transistor base being unconnected in floating condition, with the emitter and one base junction of the first unijunction transistor being placed in series with the high frequency signals between the input and output terminals and with the emitter and one base junction of the second unijunction transistor being placed in shunt relationship with said high frequency signals to bypass said signals selectively to A.C. ground in correspondence with the forward bias from the bias circuit.

3. The attenuator as recited in claim 2 and further including a high frequency resistive network placed between the input and output terminals in parallel with the emitter and one base junction of the first unijunction transistor and formed of a first and a second resistor and an A.C. bypass capacitor interconnecting the first and second resistors in series relationship, with the emitter and one base junction of the second unijunction transistor being coupled between the junction of the first resistor and capacitor to A.C. ground, and wherein the biasing circuit further includes a variable resistive network placed in series relationship with both said emitters to one base junction of said unijunction transistors to selectively vary the forward biasing currents of the junctions inversely with respect to each other.

4. The attenuator as recited in claim 3 wherein said variable resistive network includes a differential amplifier including a pair of differentially connected transistors each having an emitter, a base and a collector, with the emitters coupled to one another and to ground and with the collectors respectively in series connection with forwardly biased junctions of the unijunction transistors and a reference source of D.C. voltage coupled to a base of one of the transistors to selectively and differentially render said transistors conductive in response to a signal applied to the base of the other transistor.

References Cited

UNITED STATES PATENTS

| | | | |
|---|---|---|---|
| 3,243,719 | 3/1966 | Scaroni | 330—29 |
| 3,343,099 | 9/1967 | Paul | 330—29 X |

FOREIGN PATENTS

| | | |
|---|---|---|
| 514,614 | 1939 | Great Britain. |
| 935,759 | 9/1963 | Great Britain. |

ROY LAKE, Primary Examiner

J. B. MULLINS, Assistant Examiner

U.S. Cl. X.R.

307—301; 330—145